(12) United States Patent
Anno

(10) Patent No.: US 11,922,075 B2
(45) Date of Patent: Mar. 5, 2024

(54) IMAGE FORMING APPARATUS AND METHOD OF CONTROLLING IMAGE FORMING APPARATUS

(71) Applicant: CANON KABUSHIKI KAISHA, Tokyo (JP)

(72) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,222

(22) Filed: Nov. 22, 2022

(65) Prior Publication Data

US 2023/0168843 A1 Jun. 1, 2023

(30) Foreign Application Priority Data

Nov. 29, 2021 (JP) .................................. 2021-192725

(51) Int. Cl.
  *G06F 3/12* (2006.01)
(52) U.S. Cl.
  CPC .......... *G06F 3/1204* (2013.01); *G06F 3/1267* (2013.01)
(58) Field of Classification Search
  None
  See application file for complete search history.

(56) References Cited

U.S. PATENT DOCUMENTS

| 2017/0054869 A1* | 2/2017 | Sochi ..................... G06F 3/1204 |
| 2019/0069166 A1* | 2/2019 | Koizumi ............... H04W 8/005 |

FOREIGN PATENT DOCUMENTS

JP 2018099837 A 6/2018

* cited by examiner

*Primary Examiner* — Frantz Bataille
(74) *Attorney, Agent, or Firm* — Canon U.S.A., Inc. IP Division

(57) ABSTRACT

An image forming apparatus is capable of receiving, from an image control apparatus capable of performing raster image processor (RIP) processing upon data, a print job and executing the received print job. The image forming apparatus includes a storage unit configured to store a print job, an acquisition unit configured to acquire unique information of the image control apparatus from the image control apparatus, and a controller configured to set, for a function of storing the received print job in the storage unit without executing the received print job until a print instruction is received, exception conditions for not storing the received print job. In response to acquisition of the unique information of the image control apparatus, the controller automatically sets the exception conditions based on the unique information.

20 Claims, 7 Drawing Sheets

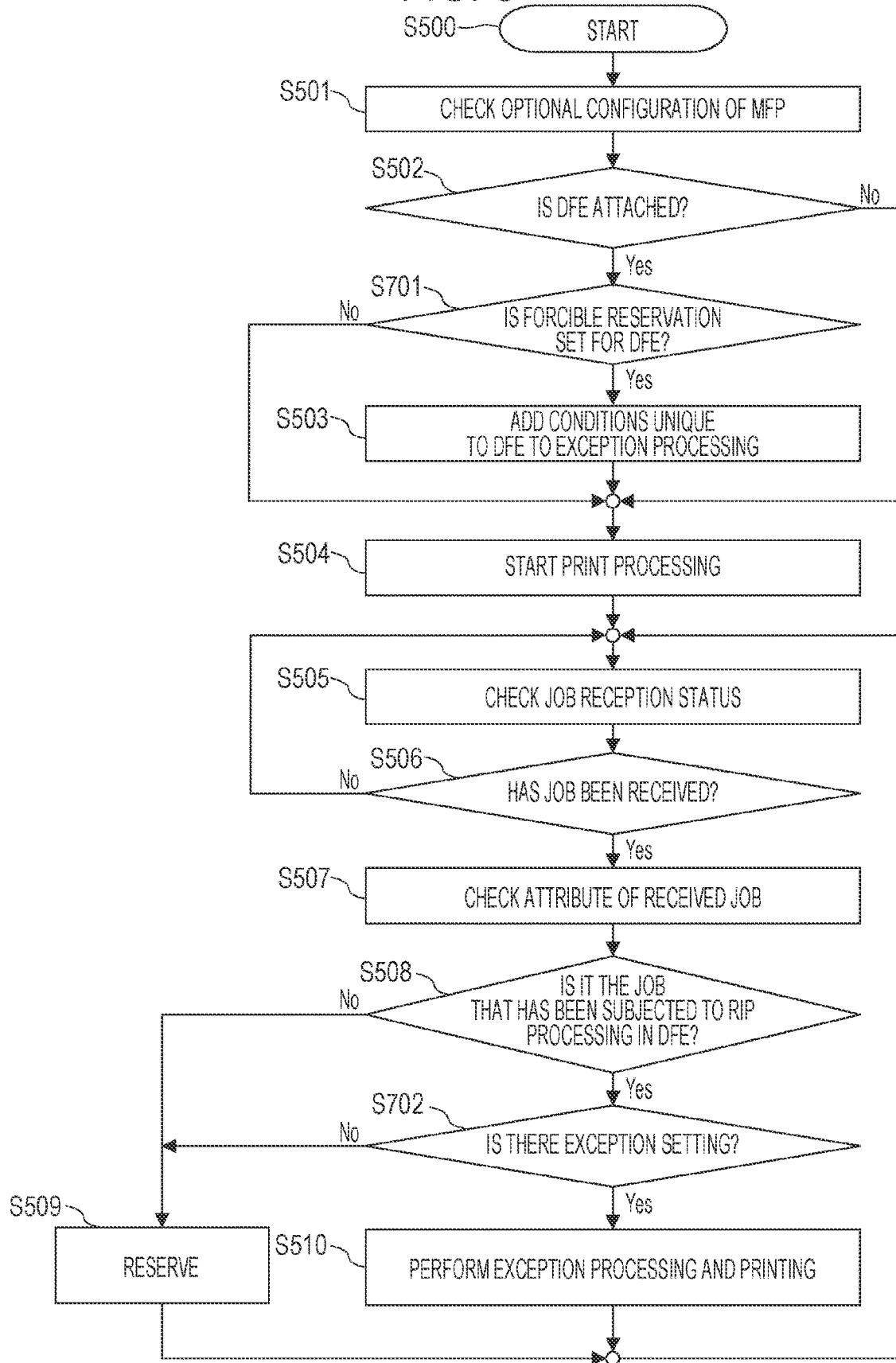

IMAGE FORMING APPARATUS AND METHOD OF CONTROLLING IMAGE FORMING APPARATUS

BACKGROUND

Field of the Disclosure

The present disclosure relates to an image forming apparatus and a method of controlling an image forming apparatus.

Description of the Related Art

In image forming apparatuses represented by printers and multi-function peripherals, an operation mode can be set to a forcible reservation mode for the purpose of improving security and suppressing the leaving of printed sheets in current years. An image forming apparatus operating in the forcible reservation mode stores a print job transmitted from a PC therein to forcibly reserve the print job. When a user who has issued a transmission instruction with the PC makes a print instruction with the operation panel of the image forming apparatus, the forcibly reserved print job is printed. Since only an authorized user outputs a printed sheet, security is improved. Since the print instruction is made with the operation panel of the image forming apparatus for the output of a printed sheet, the leaving of the printed sheet can be suppressed.

An image control apparatus called a print controller or a raster image processor (RIP) controller is sometimes connected to an image forming apparatus to increase and improve the print processing power, function, or ease-of-use of the image forming apparatus. In a print system including the combination of an image forming apparatus and an image control apparatus, the image control apparatus processes a print job to make the print job easier to operate and performs RIP processing upon the print job more rapidly than the image forming apparatus, and the image forming apparatus prints and outputs the print job. This image control apparatus also has a mode in which processing of a received print job is forcibly reserved therein for the purpose of improving security and suppressing the leaving of printed sheets. When a user who has issued a transmission instruction with a PC makes a print instruction with the operation screen of the image control apparatus, the forcibly reserved print job is transmitted to the image forming apparatus.

For example, Japanese Patent Laid-Open No. 2018-99837 discloses that, when a print job is received from an information processing terminal in accordance with a near field communication protocol, the print job is not forcibly reserved and a printout is performed for increase in convenience.

SUMMARY

An image forming apparatus according to embodiments of the present disclosure is capable of receiving, from an image control apparatus capable of performing raster image processor (RIP) processing upon data, a print job and executing the received print job. The image forming apparatus includes a storage unit configured to store a print job, an acquisition unit configured to acquire unique information of the image control apparatus from the image control apparatus, and a controller configured to set, for a function of storing the received print job in the storage unit without executing the received print job until a print instruction is received, exception conditions for not storing the received print job. In response to acquisition of the unique information of the image control apparatus, the controller automatically sets the exception conditions based on the unique information.

Further features of the present disclosure will become apparent from the following description of exemplary embodiments with reference to the attached drawings.

BRIEF DESCRIPTION OF THE DRAWINGS

FIG. 6 is a flowchart illustrating the process of an image forming apparatus.

DESCRIPTION OF THE EMBODIMENTS

Embodiments of the present disclosure will be described in detail with reference to the accompanying drawings. The following embodiments do not limit the present disclosure, and not all the combinations of the features described in the embodiments are essential for a method for solving the issues in the present disclosure. An image processing apparatus is used in some embodiments as an example of an information processing apparatus, but an information processing apparatus is not limited thereto.

Figure 1A:
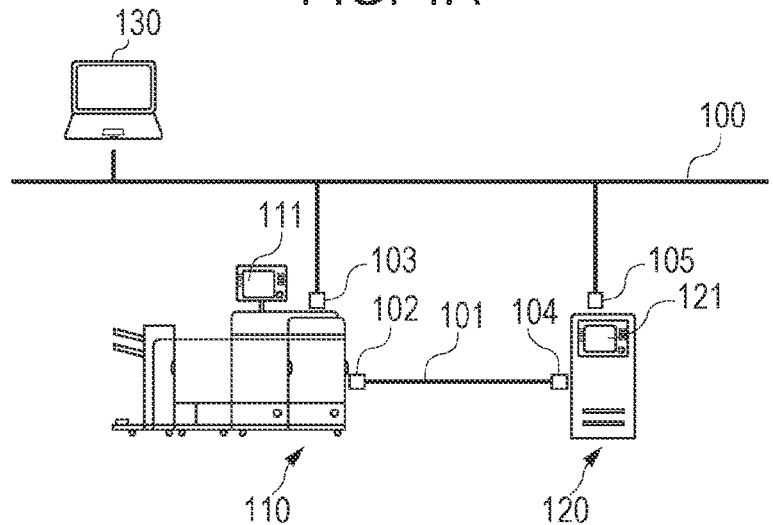
FIGS. 1A to 1C are diagrams each illustrating the configuration of a print system.
Figure 1B:
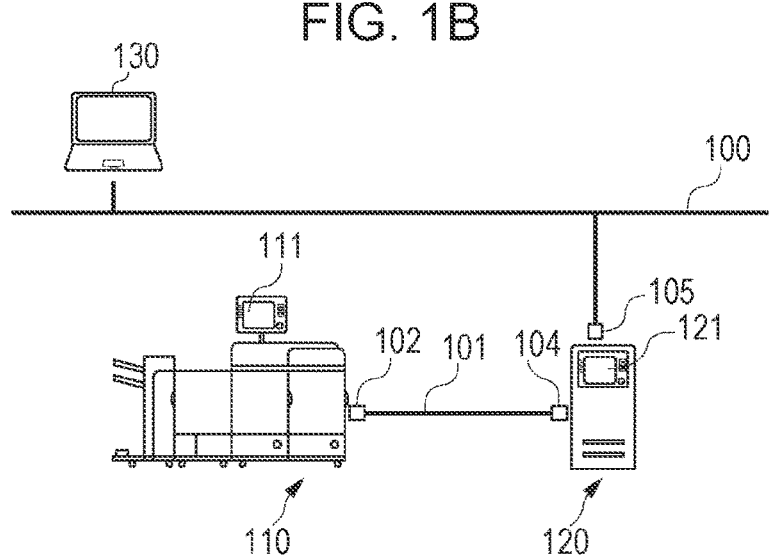
Figure 1C:
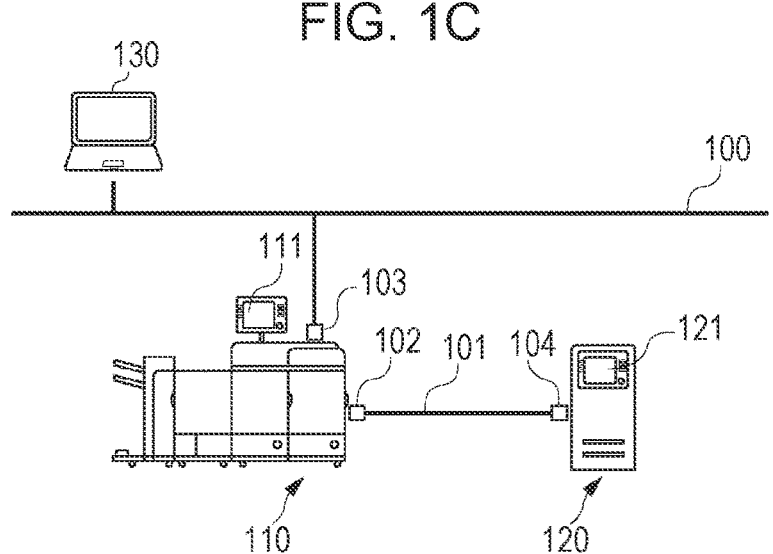

FIGS. 1A to 1C are diagrams each illustrating the configuration of a print system.

An image forming apparatus is hereinafter referred to as a multifunction peripheral (MFP) 110. Similarly, an image control apparatus is hereinafter referred to as a digital front end (DFE) 120. The DFE 120 has a port 105 for a network represented by a 1 Gigabit Ethernet and is connected to a network 100. In addition to the port 105, the DFE 120 has a port 104 for a network represented by a 1 Gigabit Ethernet or a high-speed communication line represented by HDMI® or USB which is used for connection to the MFP 110. Alternatively, both a network represented by a 1 Gigabit Ethernet and a high-speed communication line represented by HDMI® or USB may be provided.

However, they are illustrated by a single representative line in the drawing.

The MFP 110 has a port 102 for a network represented by a 1 Gigabit Ethernet or a high-speed communication line represented by HDMI® or USB which is used for connection to the DFE 120. The MFP 110 and the DFE 120 are connected via a network 101. The network 100 connected to the port 105 of the DFE 120 is connected to a terminal such as a PC or a server and is a network called an officenet or an intranet. This terminal such as a PC or a server is represented by a terminal 130 in FIG. 1A. A smartphone represented by iphone® of Apple Inc. can be connected to the network 100 by Wi-Fi and is also an example of the terminal 130.

The MFP 110 includes an operation unit 111, and the DFE 120 includes an operation unit 121.

The operation units 111 and 121 are integrated with the MFP 110 and the DFE 120, respectively in FIG. 1A, but may be separate monitors like the case where the monitor of a PC is not sometimes integrated with the body of the PC and is a separate monitor. The operation units 111 and 121 may be monitors of respective terminals such as remote desktop functions or thin clients on the network 100. The network 100 is illustrated as a precedence network, but may be a wireless communication such as Wi-Fi.

A print system according to an embodiment will be described with reference to FIG. 1A.

First, the configuration illustrated in FIG. 1A will be described.

The MFP 110 and the DFE 120 are viewed as different apparatuses from the terminal 130 on the network 100. When the terminal 130 designates an IP address assigned to a port 103 of the MFP 110, it can transmit a print job to the MFP 110. When the terminal 130 designates an IP address assigned to the port 105 of the DFE 120, is can transmit a print job to the DFE 120.

That is, when the terminal 130 transmits a print job to the DFE 120, the DFE 120 performs raster image processor (RIP) processing upon the print job, generates a print job including RIP-processed data, and transmits the generated print job to the MFP 110. The MFP 110 performs a printout. When the DFE 120 transmits the RIP-processed print data to the MFP 110, the IP address assigned to the port 104 of the DFE 120 is set as a transmission source. The DFE 120 transmits the print data on the network 101 by using the IP address assigned to the port 102 of the MFP 110 as a transmission destination.

Next, an issue when the configuration illustrated in FIGS. 4 and 5 to be described below is not applied to the configuration illustrated in FIG. 1A will be described.

The DFE 120 reserves a print job received from the terminal 130. Upon receiving a print instruction for the reserved print job from a user, the DFE 120 performs RIP processing upon data included in the print job and transmits RIP-processed data to the MFP 110. The MFP 110 reserves all of print jobs including RIP-processed data received from the DFE 120 and the terminal 130. Upon receiving a print instruction for the reserved print jobs from a user again, the MFP 110 executes the print jobs.

Thus, for execution of a single print job, a user needs to make a plurality of print instructions. On the other hand, a method of canceling the forcible reservation mode is considered. However, when the method is employed, the MFP 110 reserves a print job received from the terminal 130 and performs a printout in response to a print instruction. That is, when the forcible reservation mode of the MFP 110 is simply canceled, a print job directly received from the terminal 130 is not reserved.

Figure 4A:
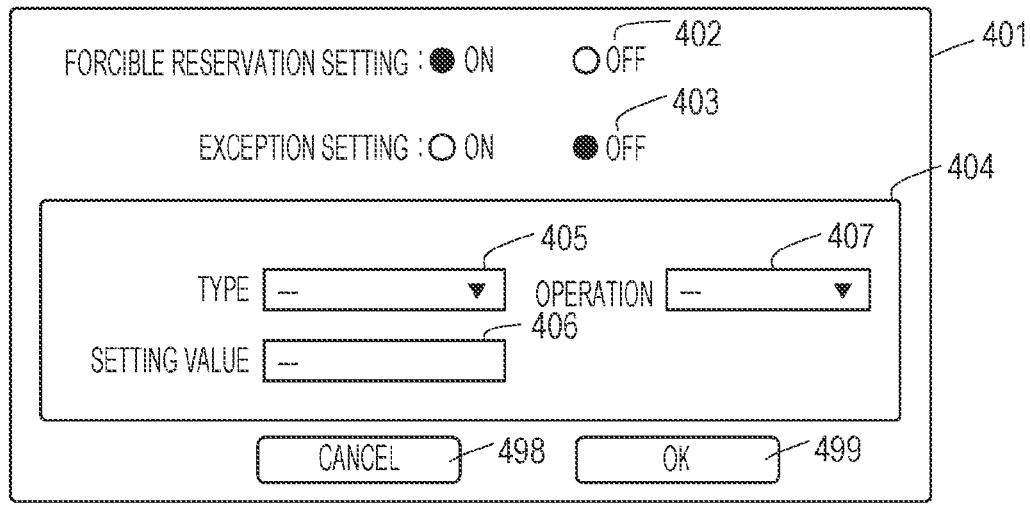
FIGS. 4A to 4E are diagrams each illustrating a setting screen in an operation unit.
Figure 4B:
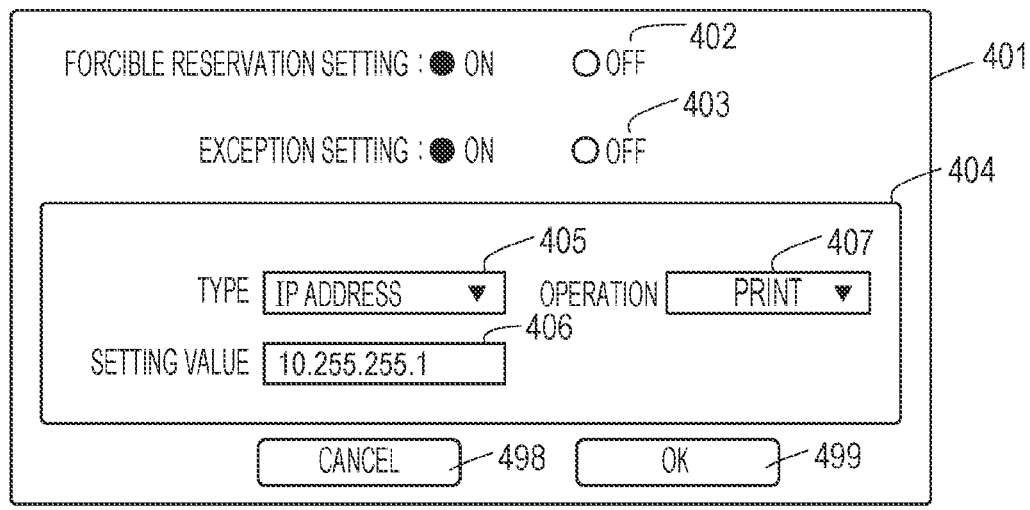
Figure 4C:
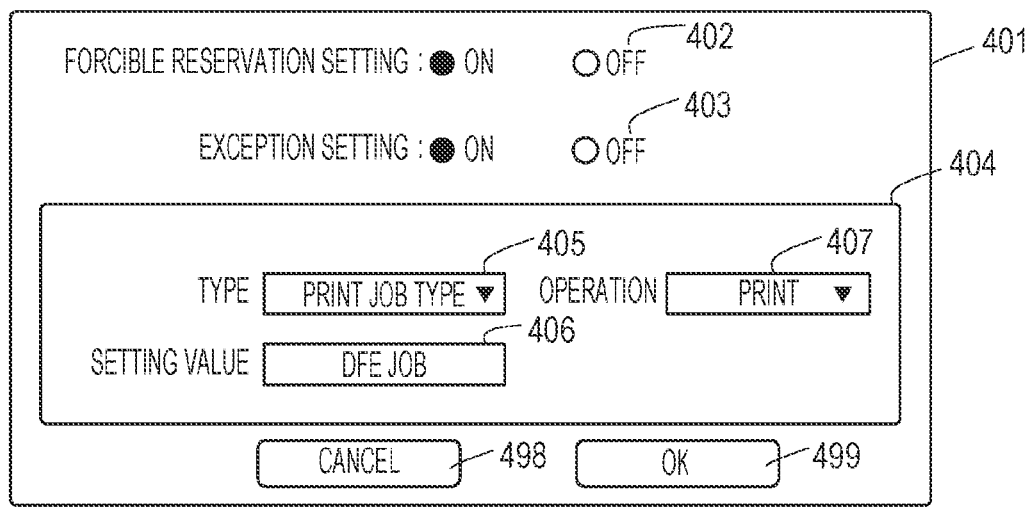
Figure 4D:
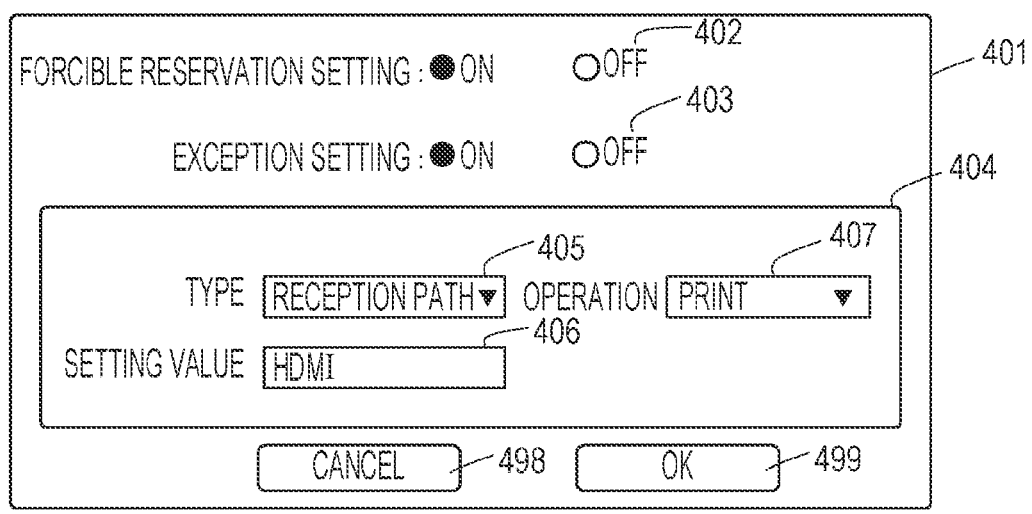
Figure 4E:
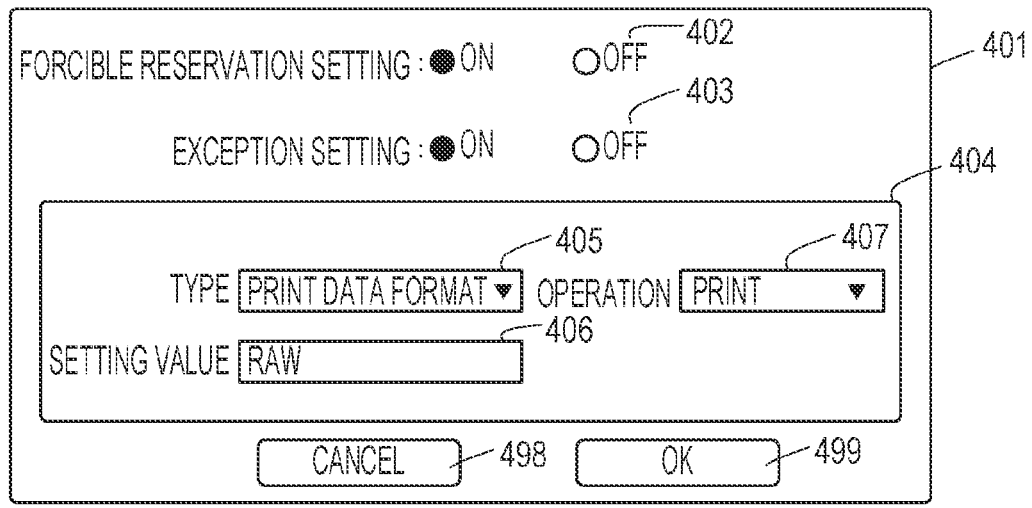
Figure 5:
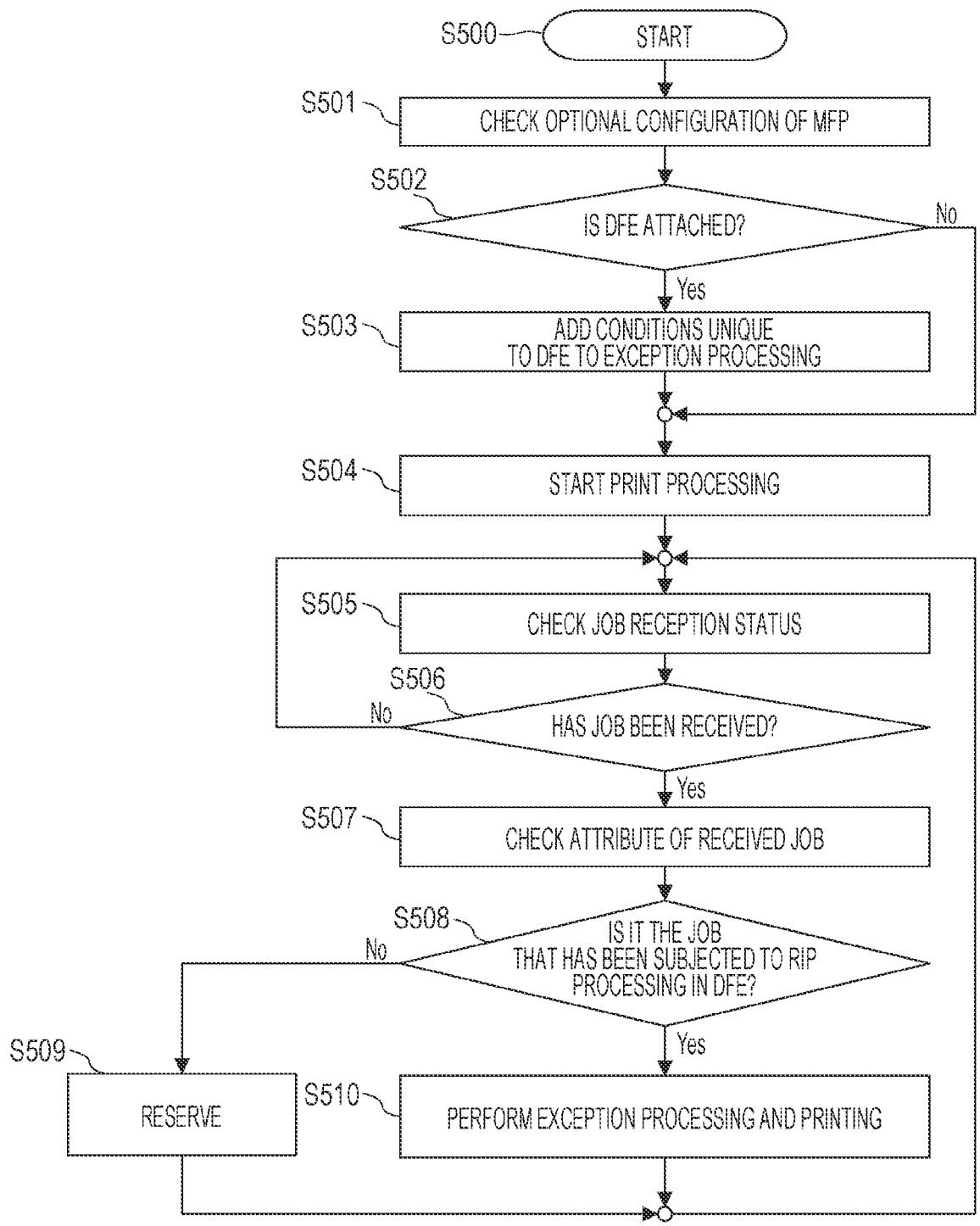
FIG. 5 is a flowchart illustrating the process of an image forming apparatus.

By applying the configuration illustrated in FIGS. 4 and 5 to the configuration illustrated in FIG. 1A in the present embodiment, a print job that has been subjected to RIP processing in an image control apparatus can be executed with a single print instruction even if the forcible reservation mode of an image forming apparatus is set. Furthermore, a job that has been subjected to RIP processing in an image control apparatus and a print job directly received by an image forming apparatus from a terminal can be executed with a single print instruction. The reason why the terminal 130 can transmit print jobs to the MFP 110 and the DFE 120 is that the MFP 110 and the DFE 120 have respective advantages. The MFP 110 has a unique page description language (PDL), and the DFE 120 performs high-speed RIP processing. A user determines which of the MFP 110 and the DFE 120 is suitable for execution of print processing on the basis of the respective advantages of them and transmits a print job to the determined one of them.

Next, a print system according to another embodiment will be described with reference to FIG. 1B. First, the configuration illustrated in FIG. 1B will be described. FIG. 1B illustrates the configuration in which the MFP 110 is not connected to the network 100 and only the DFE 120 is connected to the network 100. In this configuration, the MFP 110 does not have the port 103 and is not directly connected to the network 100. To cause the MFP 110 to perform print processing, the terminal 130 transmits a print job to the DFE 120. That is, the terminal 130 sets the IP address assigned to the port 105 as a transmission destination and transmits a print job. Upon receiving the print job via the port 105, the DFE 120 determines that the print job should be subjected to RIP processing in the MFP 110 when there is a specific character string at a specific position such as the beginning of a print job and transmits the received print job to the MFP 110 without a print instruction from a user. Upon receiving the print job from the terminal 130 via the DFE 120, the MFP 110, which is an image forming apparatus, reserves the print job and performs a printout in response to a print instruction from a user like the case where the MFP 110 directly receives a print job from the terminal 130 in the configuration illustrated in FIG. 1A. To cause the DFE 120 to perform RIP processing, a print job is transmitted from the terminal 130 to the DFE 120 as described with reference to FIG. 1A. The DFE 120 determines that it should process (perform RIP processing upon) the print job because there is no specific character string at a specific position such as the beginning of a print job.

Next, an issue when the configuration illustrated in FIGS. 4 and 5 to be described below is not applied to the configuration illustrated in FIG. 1B will be described.

Both a print job to be subjected to print processing in the MFP 110 and a print job to be subjected to RIP processing in the DFE 120 are transmitted from the terminal 130 to the port 105 of the DFE 120.

The DFE 120 determines whether there is a specific character string at a specific position such as the beginning of a received print job. When determining that there is no specific character string, the DFE 120 reserves the print job as the print job to be subjected to RIP processing. Upon receiving a print instruction for the reserved print job from a user, the DFE 120 performs RIP processing upon the print job and transmits RIP-processed print data to the MFP 110. The MFP 110 reserves the received print data. Upon receiving a print instruction for the reserved print job from a user again, the MFP 110 executes the print job. Thus, for execution of a single print job, a user needs to make a plurality of print instructions.

When determining that there is a specific character string at a specific position such as the beginning of a job, the DFE 120 does not reserve the job and transmits the job to the MFP 110. The DFE 120 does not perform RIP processing upon a job including a specific character string at a specific position.

On the other hand, upon receiving print jobs from the DFE 120, the MFP 110 reserves all of the print jobs and performs a printout in response to a print instruction. That is, a print job to be subjected to RIP processing in the DFE 120 is reserved by both the DFE 120 and the MFP 110 while a print job to be processed by the MFP 110 is reserved by only the MFP 110 as described with reference to FIG. 1A. Thus, for execution of a single print job, a user needs to make a plurality of print instructions.

On the other hand, a method of canceling the forcible reservation mode is considered also in the configuration illustrated in FIG. 1B. However, when the method is employed, the MFP 110 performs the printout of a print job received from the terminal 130 via the DFE 120 without reserving the print job. That is, when the forcible reservation mode of the MFP 110 is simply canceled, a print job that the MFP 110 has received from the terminal 130 via the DFE 120 is not reserved.

By applying the configuration illustrated in FIGS. 4 and 5 to the configuration illustrated in FIG. 1B in the present embodiment, a print job that has been subjected to RIP processing in an image control apparatus can be executed with a single print instruction even if the forcible reservation mode of an image forming apparatus is set. Furthermore, even if the forcible reservation mode of an image forming apparatus is set, a job that has been subjected to RIP processing in an image control apparatus and a job that has not been subjected to RIP processing in the image control apparatus can be executed with a single print instruction.

In the above description regarding the configuration in FIG. 1B, the DFE 120 determines whether there is a specific character string at a specific position such as the beginning of a print job transmitted from the terminal 130 and determines whether the DFE 120 itself performs RIP processing upon the print job or transmits the print job to the MFP 110 on the basis of a result of the determination. Another method is considered. For the port 105 of the DFE 120, a specific TCP/UDP port number for reception of a print job to be processed by the MFP 110 is set. Processing is performed for transferring all the network packets received with the port number to an IP address assigned to the port 102 of the MFP 110. The terminal 130 transmits a print job to be processed by the MFP 110 to the specific port. The DFE 120 transfers all the packets transmitted to the port to the MFP 110. As a result, even if a print job is transmitted to the DFE 120, the job is processed by the MFP 110 without being subjected to RIP processing in the DFE 120.

Next, a print system according to another embodiment will be described with reference to FIG. 1C. First, the configuration illustrated in FIG. 1C will be described.

FIG. 1C illustrates the configuration in which the DFE 120 is not connected to the network 100 and only the MFP 110 is connected to the network 100. In this configuration, the DFE 120 does not have the port 105 and is not directly connected to the network 100. To cause the DFE 120 to perform RIP processing, the terminal 130 transmits a print job to the MFP 110. That is, the terminal 130 sets the IP address assigned to the port 103 as a transmission destination and transmits a print job.

Upon receiving the print job via the port 103, the MFP 110 determines that the print job should be subjected to RIP processing in the DFE 120 when there is a specific character string at a specific position such as the beginning of a print job and transmits the received print job to the DFE 120. Upon receiving the print job, the DFE 120 performs RIP processing upon the print job and transmits the RIP-processed print data to the MFP 110. The MFP 110 performs the printout of the received RIP-processed print data. Other than the method of determining whether there is a specific character string at a specific position such as the beginning of a print job, another method is considered.

The MFP 110 sets a specific TCP/UDP port number for reception of a print job to be processed by the DFE 120. Processing is performed for transferring all the network packets received with the port number to an IP address assigned to the port 104 of the DFE 120. The terminal 130 transmits a print job to be subjected to RIP processing in the DFE 120 to the specific port. The MFP 110 transfers all the packets transmitted to the port to the DFE 120. As a result, even if a print job is transmitted to the MFP 110, the job is subjected to RIP processing in the DFE 120 without being processed by the MFP 110.

Next, an issue when the configuration illustrated in FIGS. 4 and 5 to be described below is not applied to the configuration illustrated in FIG. 1C will be described. Print jobs to be subjected to RIP processing in the DFE 120 among print jobs transmitted from the terminal 130 are transmitted to the DFE 120 by the above-described processing. Upon receiving a print job, the DFE 120 reserves the received print job. Upon receiving a print instruction for the reserved print job from a user, the DFE 120 performs RIP processing upon the print job and transmits RIP-processed print data to the MFP 110. The MFP 110 reserves all the print data received from the DFE 120. Upon receiving a print instruction for the reserved print job from a user again, the MFP 110 executes the print job. Thus, for execution of a single print job, a user needs to make a plurality of print instructions. On the other hand, a method of canceling the forcible reservation mode is considered. However, when the method is employed, the MFP 110 performs the printout of a print job received from the terminal 130 without reserving the print job. That is, when the forcible reservation mode of the MFP 110 is simply canceled, a print job that the MFP 110 has received from the terminal 130 is not reserved.

By applying the configuration illustrated in FIGS. 4 and 5 to the configuration illustrated in FIG. 1C in the present embodiment, a print job that has been subjected to RIP processing in an image control apparatus can be executed with a single print instruction even if the forcible reservation mode of an image forming apparatus is set. Furthermore, a job that has been subjected to RIP processing in an image control apparatus and a print job directly received by an image forming apparatus from a terminal can be executed with a single print instruction.

The following description of an embodiment will be made with reference to FIG. 1A, but the embodiment can be realized with all the configurations illustrated in FIGS. 1A to 1C.

Next, a hardware configuration according to an embodiment will be described.

Figure 2A:
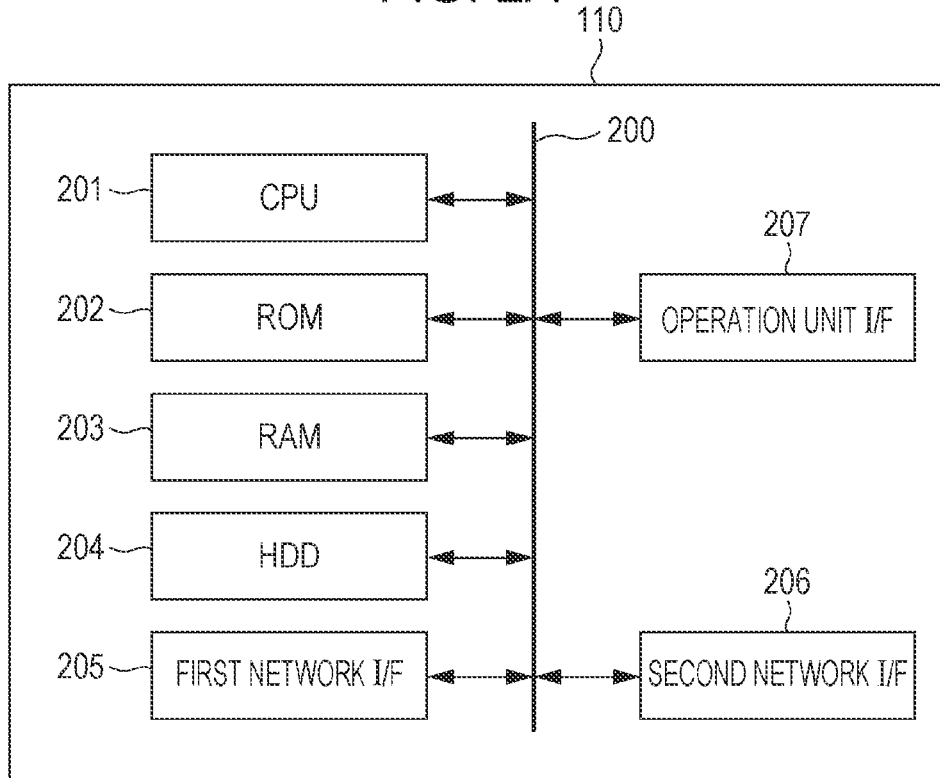
FIGS. 2A and 2B are diagrams each illustrating a hardware configuration.

FIG. 2A is a block diagram describing the hardware configuration of the MFP 110.

A CPU 201 deploys a control program stored in a ROM 202 or a hard disk (HDD) 204 into a RAM 203 and executes the deployed program to comprehensively control access to various devices connected to a system bus 200. The ROM 202 stores, for example, a control program that the CPU 201 can execute. The RAM 203 functions as, for example, a main memory or a work area for the CPU 201 and is configured to be able to expand the memory capacity thereof by an optional RAM connected to an expansion port (not illustrated). The HDD 204 stores, for example, an executable control program, a boot program, various applications, font data, user files, edit files, and setting data.

Although the HDD 204 is used in the embodiment, an SD card, a flash memory, or the like may be used as a storage device in addition to the HDD on condition that contents thereof are not deleted and remain stored therein even after powering off. The same thing can be said for apparatuses having HDDs to be described below. A first network interface (I/F) 205 is the hardware of the port 102 to be connected to the DFE 120. The first network I/F 205 may be for a network represented by a 1 Gigabit Ethernet or a high-speed communication line represented by HDMI® or USB as described with reference to FIG. 1, and the following description will be made assuming that the first network I/F 205 is for a network. A second network interface (I/F) 206 is the hardware of the port 103 connected to network 100 represented by a 1 Gigabit Ethernet.

Figure 2B:
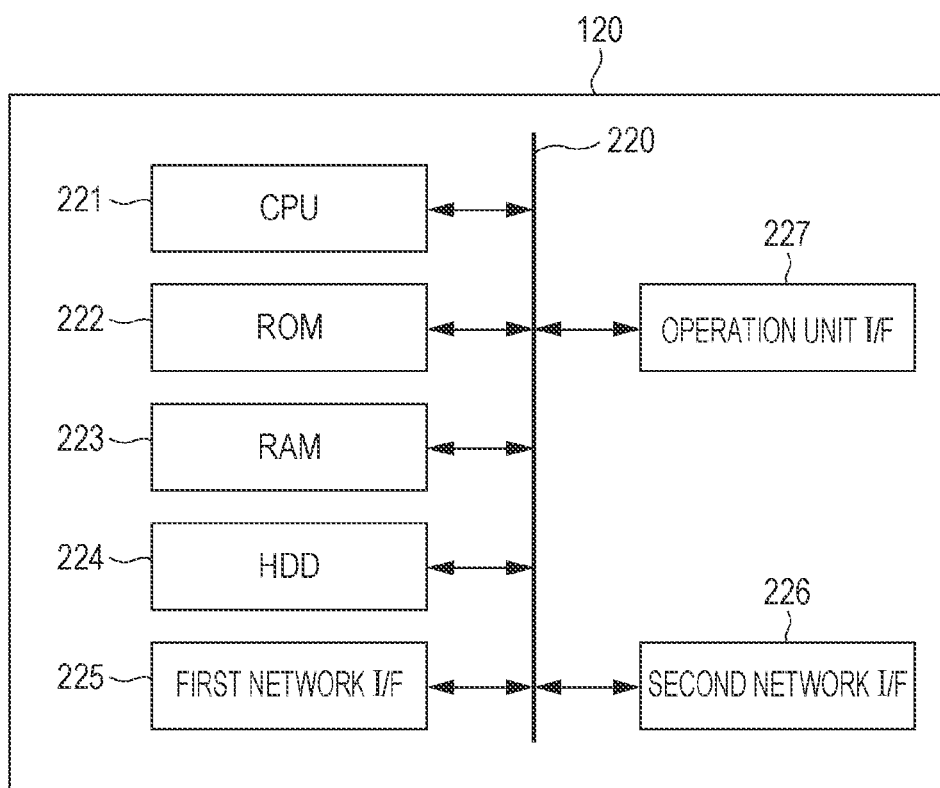

FIG. 2B is a block diagram describing the hardware configuration of the DFE 120. A CPU 221 similarly deploys a control program stored in a ROM 222 or a hard disk (HDD) 224 into a RAM 223 and executes the deployed program to comprehensively control access to various devices connected to a system bus 220. The ROM 222 stores, for example, a control program that the CPU 221 can execute. The RAM 223 functions as, for example, a main memory or a work area for the CPU 221 and is configured to be able to expand the memory capacity thereof by an optional RAM connected to an expansion port (not illustrated).

The HDD 224 stores, for example, an executable control program, a boot program, various applications, font data, user files, edit files, and setting data.

Although the HDD 224 is used in the embodiment, an SD card, a flash memory, or the like may be used as a storage device in addition to the HDD on condition that contents thereof are not deleted and remain stored therein even after powering off. The same thing can be said for apparatuses having HDDs to be described below. A first network interface (I/F) 225 is the hardware of the port 104 to be connected to the MFP 110. The first network I/F 225 may be for a network represented by a 1 Gigabit Ethernet or a high-speed communication line represented by HDMI® or USB as described with reference to FIG. 1, and the following description will be made assuming that the first network I/F 225 is for a network. A second network interface (I/F) 226 is the hardware of the port 105 connected to the network 100 represented by a 1 Gigabit Ethernet.

The switching from the configuration in FIG. 1A to the configuration in FIG. 1B can be achieved by providing both the pieces of hardware of the first network I/F 205 and the second network I/F 206 in the MFP 110 and not connecting a network cable to the second network I/F 206. The switching from the configuration in FIG. 1A to the configuration in FIG. 1C can be similarly achieved by providing both the pieces of hardware of the first network I/F 225 and the second network I/F 226 in the DFE 120 and not connecting a network cable to the second network I/F 226. If it is difficult to provide two network ports as pieces of hardware in the MFP 110, the second network I/F 206 can be enabled by attaching a between adapter to a USB port (not illustrated) to set the USB port as an Ethernet port. By not attaching this USB between adapter, the configuration illustrated in FIG. 1B is obtained because the second network I/F 206 is not enabled. The same thing can be said for the DFE 120.

Thus, using the hardware configurations illustrated in FIGS. 2A and 2B, the configurations illustrated in FIGS. 1A, 1B, and 1C can be obtained.

A functional block configuration of software according to the present embodiment will be described.

Figure 3A:
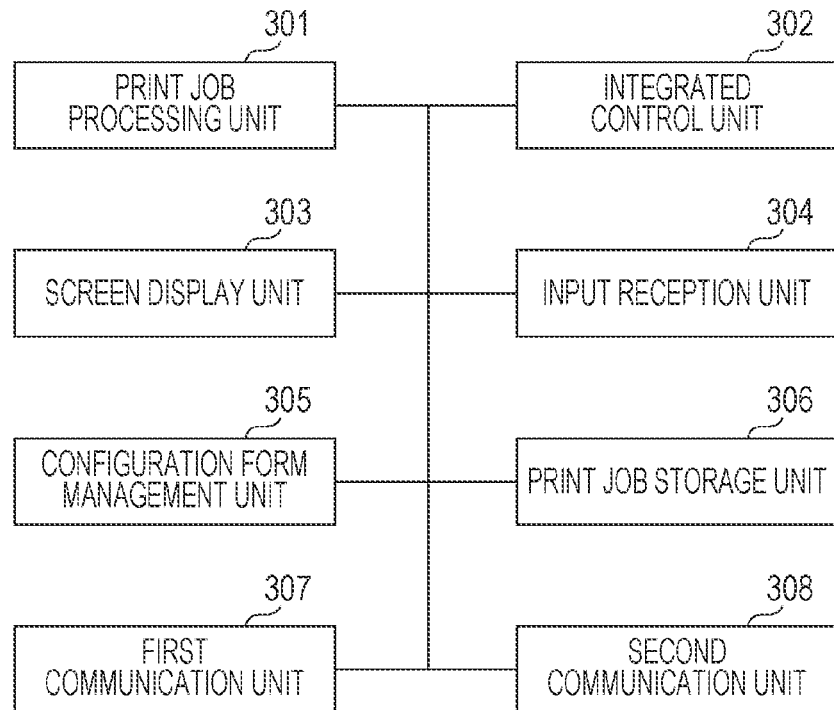
FIGS. 3A and 3B are functional block diagrams of software.

FIG. 3A is a functional block diagram of the MFP 110. This is enabled by causing the CPU 201 to read a program stored in the ROM 202 or the HDD 204, deploy the program into the RAM 203, and execute the program.

A first communication unit 307 and a second communication unit 308 control communication performed with the first network I/F 205 and the second network I/F 206 described with reference to FIG. 2A. Each of the first communication unit 307 and the second communication unit 308 may control any one of the first network I/F 205 and the second network I/F 206. However, in the present embodiment, the first communication unit 307 and the second communication unit 308 control the first network I/F 205 connected to the DFE 120 and the second network I/F 206 connected to the terminal 130, respectively.

A print job processing unit 301 processes a print job received from the first communication unit 307 or the second communication unit 308. A print job storage unit 306 is a function of storing a received print job in the MFP 110 before the printout of the print job. When a forcible reservation setting to be described with reference to FIG. 4 is set to "ON (enabled)", the print job storage unit 306 reserves a print job. When the forcible reservation setting is enabled, the image forming apparatus stores received print data in a forcible storage area (a part of the storage area of the HDD 204) for storing print data until a print instruction from a user is received. Only a user who is authorized by an authentication unit (IC card authentication or keyboard authentication) can make a print instruction for the print data stored in the forcible storage area from viewpoint of security. More specifically, received print data is provided with and associated with the username of a user who has logged into a transmission terminal as an owner name of a job and is stored in the forcible storage area. When the job owner name associated with the print data stored in the forcible storage area and the username of the user authorized by the above authentication processing match, printing of the print data stored in the forcible storage area is permitted.

A screen display unit 303 displays, for example, an operational menu and the state of an apparatus on the screen of the operation unit 111 included in the MFP 110. An input reception unit 304 receives an instruction input via the operation unit 111 in the MFP 110. When a print instruction for a reserved print job is input via the operation unit 111 in the MFP 110, the print job processing unit 301 prints the print job reserved in the print job storage unit 306.

A configuration form management unit 305 determines whether the DFE 120 is connected to the MFP 110 and manages the connection state. An integrated control unit 302 control the entire function in cooperation with each of the above-described units.

Figure 3B:
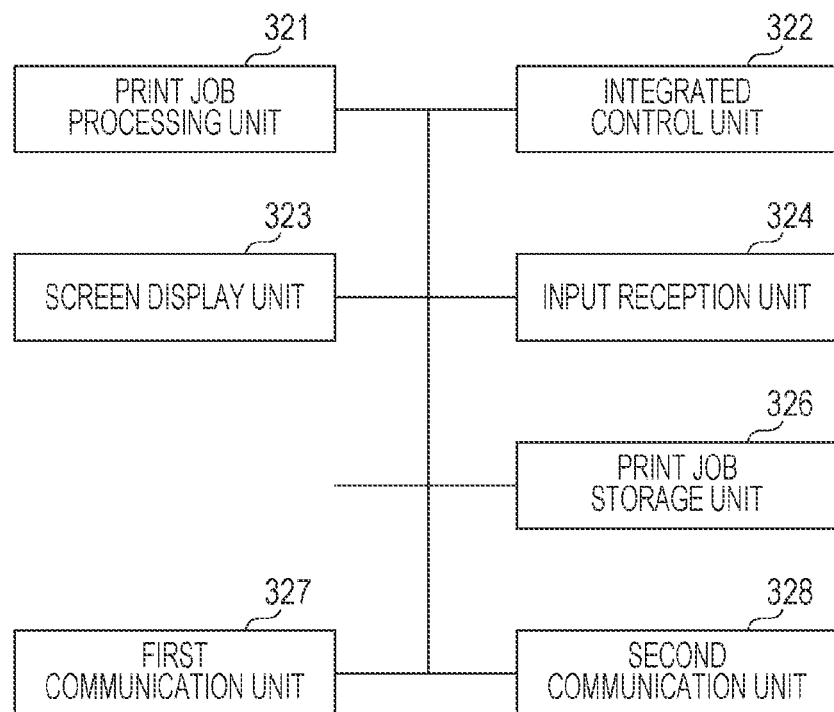

FIG. 3B is a functional block diagram of the DFE 120. This is enabled by causing the CPU 221 to read a program stored in the ROM 222 or the HDD 224, deploy the program into the RAM 223, and execute the program.

A first communication unit 327 and a second communication unit 328 control communication performed with the first network I/F 225 and the second network I/F 226 described with reference to FIG. 2B. Each of the first communication unit 327 and the second communication unit 328 may control any one of the first network I/F 225 and the second network I/F 226. However, in the present embodiment, the first communication unit 327 and the second communication unit 328 control the first network I/F 225 connected to the MFP 110 and the second network I/F 226 connected to the terminal 130, respectively.

A print job processing unit 321 processes a print job received from the first communication unit 327 or the second communication unit 328. A print job storage unit 326 is a function of storing a received print job in the DFE 120 before the printout of the print job. When a forcible reservation setting unique to the DFE 120, which is different from the forcible reservation setting of the MFP 110 described with reference to FIG. 3A, is set to "ON", the print job storage unit 326 reserves a print job. A screen display unit 323 displays, for example, an operational menu and the state of an apparatus on the screen of the operation unit 121 included in the DFE 120. An input reception unit 324 receives an instruction input via the operation unit 121. When a print instruction for a reserved print job is input via the operation unit 121, the print job processing unit 301 transmits the print job reserved in the print job storage unit 326 to the MFP 110 via the first communication unit 327.

In the forcible reservation setting unique to the DFE 120, authentication processing similar to that performed in the forcible reservation setting of the MFP 110 may be performed or different authentication processing may be performed. The different authentication processing is, for example, processing for allowing a print job with a password to be received, managing a received print job with a password in a hold area in a storage area, and not performing printing until the password is received from a user.

An integrated control unit 322 controls the entire function in cooperation with each of the above-described units.

The configuration form management unit 305 in the MFP 110 determines whether the DFE 120 is connected to the MFP 110 as will be described in detail below.

The DFE 120 is an optional product, and a serviceman sets options when placing the MFP 110 and the DFE 120 in a user environment. On a so-called service mode setting screen, a setting value related to an option to be set is correctly set. For example, when the DFE 120 is attached, the value of a service mode item corresponding to the DFE 120 is changed from "not attached=0" to "attached=1". The configuration form management unit 305 reads the value of this service mode item and determines whether the DFE 120 is attached. Alternatively, the MFP 110 communicates with the DFE 120 attached thereto and controls the DFE 120. The MFP 110 transmits an attachment information acquisition command to the DFE 120 immediately after the MFP 110 and the DFE 120 have been powered on and receives a response from the DFE 120 to determine whether the DFE 120 is attached.

Alternatively, a specific parallel signal line (not illustrated) may be connected between the MFP 110 and the DFE 120 in addition to the network 101. The MFP 110 may determine whether the DFE 120 is attached by setting the telephone relay level of one of signal lines included in the parallel signal line to Hi or Lo. When the MFP 110 has a hardware configuration in which expansion hardware is attached thereto to process RIP-processed print data from the DFE 120, the MFP 110 may determine whether the DFE 120 is attached by checking the presence or absence of the expansion hardware.

The setting screen of an operation unit according to the present embodiment will be described.

FIG. 4A illustrates a screen displayed on the operation unit 111 in the MFP 110. This is enabled by causing the CPU 201 to read a program stored in the ROM 202 or the HDD 204, deploy the program into the RAM 203, and execute the program.

On a screen 401 displayed on the operation unit 111, the following elements are provided.

There is a setting 402 for setting or displaying "ON (enabled)" or "OFF (disabled)" of the forcible reservation setting. The "ON" and "OFF" are radio buttons, one of which can be selected. A black circle represents being selected, and FIG. 4A therefore illustrates the case where the "ON" is set. When the "ON" is set on the forcible reservation setting 402, the print job storage unit 306 reserves a print job as described with reference to FIG. 3A. The setting of the "ON" or "OFF" of the forcible reservation setting is performed by a user in consideration of the security of a print job and the policy of suppressing the leaving of a printed sheet.

There is an exception setting 403 for setting or displaying the "ON" or "OFF" of an exception setting. The "ON" and "OFF" are radio buttons, one of which can be selected. A black circle represents being selected, and FIG. 4A therefore illustrates the case where the "OFF" is set. There are detailed conditions 404 for displaying or setting detailed conditions of the exception setting. FIG. 4A illustrates the state in which the detailed conditions are not set.

The screen 401 is closed with a cancel 498 or an OK 499. The cancel 498 is used to close the screen without taking effect the change in details of a setting. The OK 499 is used to close the screen after the change in details of a setting has been saved and taken effect.

FIG. 4B illustrates the detailed conditions 404 for displaying or setting detailed conditions when the exception setting 403 is set to the "ON". The detailed conditions 404 in the exception setting include respective elements for displaying or setting a type 405, a setting value 406, and an operation 407. Referring to FIG. 4B, the type 405 is set to "IP address", the setting value 406 is set to "10.255.255.1", and the operation 407 is set to "print". This means that, when the transmission source of a print job has the "IP address" of "10.255.255.1", the print job is not forcibly reserved and processing of the "print" is performed.

That is, exception conditions for not performing forcible reservation are illustrated. The "10.255.255.1" is an IP address assigned to the port 104 of the DFE 120 described with reference to FIG. 1. When the DFE 120 receives print data, performs RIP processing upon the print data, and transmits the print data to the MFP 110, the IP address assigned to the port 104 is a transmission source of the print data as described with reference to FIG. 1A. When the communication between the ports 102 and 104 has a fixed IP address in the connection configuration illustrated in FIG. 1, the fixed IP address is set as the setting value 406. In the example illustrated in FIG. 4B, the fixed IP address is "10.255.255.1".

As the type 405 and the setting value 406 in the conditions, an attribute value representing the type of a print job or a reception path of print data may be set in addition to the "IP address" as will be described below. The operation 407 includes, for example, "quit" a job in addition to the "print".

The MFP 110 automatically sets the exception setting 403 and the detailed conditions 404 in a processing flow as will be described below, but a user may manually set them.

A processing flow according to the present embodiment will be described. This will be described with the configuration illustrated in FIG. 1A as described above.

FIG. 5 is a flowchart illustrating the process of the MFP 110. This is enabled by causing the CPU 201 to read a program stored in the ROM 202 or the HDD 204, deploy the program into the RAM 203, and execute the program. The integrated control unit 302 performs the process while controlling the entire function in cooperation with each of the units in FIG. 3a.

The process starts when the MFP 110 is powered on (S500). Subsequently, the optional configuration of the MFP is checked (S501). This is enabled in such a manner that the configuration form management unit 305 determines whether the DFE 120 is attached and the integrated control unit 302 acquires information about the determination as described with reference to FIG. 3A. Subsequently, it is determined whether the DFE 120 is attached (S502). This is enabled in such a manner that the integrated control unit 302 determines the information acquired in S501. When it is determined that the DFE 120 is not attached (No in S502), the process proceeds to S504. When it is determined that the DFE 120 is attached (Yes in S502), the process proceeds to S503.

In S503, conditions unique to the DFE are automatically added to exception processing. This is the exception setting 403 and the detailed conditions 404 described with reference to FIG. 4B. For example, the exception setting 403 is automatically set to the "ON", the type 405 is automatically set to the "IP address", the setting value 406 is automatically set to "10.255.255.1", and the operation 407 is automatically set to the "print". Since the IP address assigned to the DFE 120 is determined as an apparatus setting, the IP address determined in advance is set.

When the type 405 is set to the "IP address", there is the case where it cannot be determined whether it is the job from the DFE 120. Specifically, examples of the case include the case where there is a specific character string at a specific position such as the beginning of a print job and the case where a print job received with a specific TCP/UDP port number is transferred to the MFP 110 as described with reference to FIGS. 1B and 1C. In such a case, the type 405 may be set to "print job type", "reception path (communication path)", or "print data format" that are exception setting conditions to be described below with reference to FIGS. 4C to 4E.

When the IP address assigned to the DFE 120 is not determined in advance as an apparatus setting, the following method may be performed. First, information unique to the DFE 120 is acquired in S501. The unique information is, for example, an IP address, a print data format, and a print job type. In S503, the exception setting 403 such as an IP address is set on the basis of the acquired unique information.

Subsequently, the MFP 110 starts print processing (S504). The MFP 110 check a print job reception status (S505). The MFP 110 determines whether a print job has been received from the first communication unit 307 or the second communication unit 308 (S506). When it is determined that a job has not been received (No in S506), the process returns to S505 and the determination is repeated. When it is determined that a job has been received (Yes in S506), the process proceeds to S507.

Subsequently, the MFP 110 checks the attribute of the received print job (S507). For example, the integrated control unit 302 acquires the address of a transmission source of the print job received from the first communication unit 307 or the second communication unit 308. Subsequently, it is determined whether the received print job has been from the DFE 120 and subjected to RIP processing in the DFE 120 (S508). For example, when the transmission source address of the print job acquired by the integrated control unit 302 in S507 matches the setting value 406 of "10.255.255.1", it is determined that the print job has been subjected to RIP processing in the DFE 120.

When the print job has not been subjected to RIP processing in the DFE 120 (No in S508), the process proceeds to S509. When the print job has been subjected to RIP processing in the DFE 120 (Yes in S508), the process proceeds to S510. Since the print job does not correspond to the detailed conditions 404 of the exception processing, the exception processing is not performed and forcible reservation is performed in S509. Since the print job corresponds to the detailed conditions 404 of the exception processing, the exception processing is performed and the "print" that is the setting value of the operation 407 is performed in S510. That is, upon receiving a print job, the MFP 110 performs forcible reservation processing while determining whether the print job corresponds to exception processing of forcible reservation.

When the processing of S509 or S510 ends, the process proceeds to S505 for reception of the next print job and the subsequent process is repeated.

By applying the configuration illustrated in FIGS. 4 and 5 to the respective configurations illustrated in FIGS. 1A to 1C, both a print job from an image control apparatus and a print fob directly received from a terminal can be executed with a single print instruction even if the forcible reservation mode of an image forming apparatus is set as described above.

The detailed conditions 404 of the exception processing are automatically set in the process represented by the flowchart, but a request asking that a user checks setting details may be made. That is, the setting details illustrated in FIG. 4B may be displayed on the screen 401 and taken effect when a user accepts them. A user may manually perform a setting as described with reference to FIG. 4B. In this case, the process from S501 to S503 is omitted.

As the type 405 and the setting value 406 in the detailed conditions 404 in the exception setting described with reference to FIG. 4B, an attribute value representing the type of a print job or the reception path of print data may be set in addition to the "IP address".

For example, the type of a print job may be set as conditions. A print job has an attribute representing the type of a page description language (PDL), such as the PostScript (PS) or the Printer Command Language (PCL) for the description of a print job.

When the DFE 120 sets a value (DFE job) representing a print job that has been subjected to RIP processing in the DFE 120 for the attribute thereof and transmits the attribute value to the MFP 110, the MFP 110 can determine that it has received a print job that has been subjected to RIP processing in the DFE 120 on the basis of the attribute value. That is, conditions are set in which the exception setting 403 is the "ON", the type 405 is the "print job type", the setting value 406 is "DFE job", and the operation 407 is the "print". FIG. 4C illustrates a screen for this forcible reservation setting.

For example, the volume of print data of a print job that has been subjected to RIP processing in the DFE 120 is generally large, because all pixels are expressed as data. Accordingly, to transmit RIP-processed print data from the DFE 120 to the MFP 110, HDMI®, 10 Gigabit Ethernet, or a unique parallel signal line capable of transmitting large-volume data at high speeds is generally used. That is, there is the case where a reception path different from 1 Gigabit Ethernet for transmitting a general print job is used. This may be set as conditions for determining whether a print job has been subjected to RIP processing in the DFE 120. That is, conditions are set in which the exception setting 403 is the "ON", the type 405 is "reception path", the setting value 406 is "HDMI·10 Gigabit Ethernet unique parallel signal line", and the operation 407 is the "print". FIG. 4D illustrates a screen for this forcible reservation setting.

For example, the data format of a print job that is transmitted by the terminal 130 and received by the MFP 110 is data described with the PDL. RIP-processed print data transmitted by the DFE 120 is data called RAW having display values of all pixels or JBIG or JPEG obtained by compressing RAW. This difference may be set as conditions for determining whether a print job has been subjected to RIP processing in the DFE 120. That is, conditions are set in which the exception setting 403 is the "ON", the type 405 is the "print data format", the setting value 406 is "RAW·JBIG·JPEG", and the operation 407 is the "print". FIG. 4E illustrates a screen for this forcible reservation setting.

Thus, in the method of transmitting a print job that has been subjected to RIP processing in the DFE 120 from the DFE 120 to the MFP 110, the detailed conditions 404 in the exception setting can be set using characteristic conditions.

In the flowchart illustrated in FIG. 5, the description of forcible reservation processing of the DFE 120 is omitted and only the processing of the MFP 110 is described assuming that the DFE 120 forcibly reserves a received print job to be subjected to RIP processing therein. The processing of the MFP 110 may change on the basis of information about whether the DFE 120 forcibly reserves a print job to be subjected to RIP processing therein. FIG. 6 illustrate a modification of the process in FIG. 5 which is performed in this case. The same steps as those in FIG. 5 are denoted by the same reference numerals, and the description thereof will be omitted.

In S701 in FIG. 6, the integrated control unit 302 in the MFP 110 acquires from the DFE 120 via the second communication unit 308 information about whether the DFE 120 performs forcible reservation in a forcible reservation setting. When the DFE 120 is in the forcible reservation setting (Yes in S701), the process proceeds to S503. When the DFE 120 is not in the forcible reservation setting (No in S701), the process proceeds to S504.

In S508, it is determined whether the print job has been received from the DFE 120 and subjected to RIP processing in DFE 120. When the determination result is No in S508, the process proceeds to S509. When the determination result is Yes in S508, the process proceeds to S702. In S702, it is determined whether there is the exception setting. When the DFE 120 does not perform forcible reservation in S701, there is not the exception setting because the processing of S503 is not performed. Accordingly, when there is not the exception setting in S702 (No in S702), the process proceeds to S509 in which the MFP 110 performs forcible reservation. When there is the exception setting in S702 (Yes in S702), the process proceeds to S510 in which the exception processing is performed on the basis of the conditions added in S503 and printing is performed without forcible reservation.

When the forcible reservation setting is not set for the DFE 120 in the configuration illustrated in FIG. 6, processing with the exception setting is not performed and reservation is performed. Accordingly, forcible reservation is not performed in the MFP 110 when forcible reservation is performed in the DFE 120, and forcible reservation is performed in the MFP 110 when forcible reservation is not performed in the DFE 120.

As described above, a print job that has been subjected to RIP processing in the DFE 120 can be printed in the exception processing while not being forcibly reserved in the MFP 110.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192725, filed Nov. 29, 2021, which is hereby incorporated by reference herein in its entirety.

What is claimed is:

1. An image forming apparatus capable of receiving, from communicating with an image control apparatus capable of performing raster image processor (RIP) processing upon data, capable of communicating with an information processing apparatus, and having a storing function for storing a received print job in a storage unit without executing the received job until a print instruction is received from a user, the image forming apparatus comprising:
   a printer configured to print an image on a recording medium;
   a storage apparatus configured to store a print job;
   a first communication interface (IF) capable of receiving unique information and a print job from the image control apparatus;
   a second IF capable of receiving a print job from the information processing apparatus;
   a controller having one or more processors which execute instructions stored in one or more memories, the controller being configured to:
      set the unique information as exception conditions for executing a print job received through the first communication IF from the image control apparatus without a print instruction from a user based on acquisition of the unique information about the image control apparatus through the first communication IF from the image control apparatus in a state where the storing function is enabled,
   wherein, in a state where the storing function is enabled and the exception conditions are set, the controller does not execute the received print job until a print instruction for a first print job is received from a user using the storing function in a case where the first print job is received through the second communication IF from the information processing apparatus, and the controller executes a second print job without receiving a print instruction for the second print job from a user in a case where the second print job is received through the first communication IF from the image control apparatus.

2. The image forming apparatus according to claim 1, wherein the controller checks whether the image control apparatus is connected to the image forming apparatus, and
wherein, in response to acquisition of the unique information of the image control apparatus and checking of connection of the image control apparatus to the image forming apparatus, the controller automatically sets the unique information as the exception conditions.

3. The image forming apparatus according to claim 1, wherein the image control apparatus can perform RIP processing upon data and generate a print job including RIP-processed data, and
wherein, upon receiving a print job that has been subjected to RIP processing in the image control apparatus in a state in which the function is enabled and the exception conditions are set, the controller executes the print job received from the image control apparatus without a print instruction from a user.

4. The image forming apparatus according to claim 3, wherein the image control apparatus can communicate with the information processing apparatus, and
wherein, when a print job that has been transmitted from the information processing apparatus to the image control apparatus and has not been subjected to RIP processing in the image control apparatus is received from the image control apparatus in a state in which the function is enabled, the controller does not execute the print job that has not been subjected to RIP processing in the image control apparatus until a print instruction is received.

5. The image forming apparatus according to claim 1, wherein the exception conditions are an IP address of a transmission source of a print job received by the image forming apparatus.

6. The image forming apparatus according to claim 1, wherein the exception conditions are a type of a print job received by the image forming apparatus.

7. The image forming apparatus according to claim 1, wherein the exception conditions are a communication path of a print job received by the image forming apparatus.

8. The image forming apparatus according to claim 1, wherein the exception conditions are a communication path of print data of a print job received by the image forming apparatus.

9. The image forming apparatus according to claim 1, further comprising a communication interface configured to make an information notification,
wherein the communication interface makes a notification that the exception conditions have been added.

10. The image forming apparatus according to claim 1, wherein, the image control apparatus has a different storing function of storing a print job in a storage of the image control apparatus without executing the print job until a print instruction is received from a user, and
wherein the controller sets the unique information as the exception conditions for executing the print job received through the first communication IF from the image control apparatus without the print instruction from the user when the unique information about the image control apparatus is acquired through the first communication IF from the image control apparatus and the different storing function is enabled in a state where the storing function is enabled.

11. The image forming apparatus according to claim 10, wherein, when the different function is disabled in the image control apparatus, the controller does not set the exception conditions.

12. The image forming apparatus according to claim 1, wherein the controller is capable of authenticating a user, and
wherein the function allows the print instruction to be received when a user authenticated by the controller and a user who has transmitted the print job are the same.

13. A method of controlling an image forming apparatus that includes a printer configured to print an image on a recording medium, a storage apparatus configured to store a print job, a first communication interface (IF) capable of receiving unique information and a print job from the image control apparatus, a second IF capable of receiving a print job from an information processing apparatus, is capable of communicating with an image control apparatus capable of performing raster image processor (RIP) processing upon data, is capable of communicating with the information processing apparatus, and has a storing function for storing a received print job in a storage unit without executing the received job until a print instruction is received from a user, the method comprising:
setting the unique information as exception conditions for executing a print job received through the first communication IF from the image control apparatus without a print instruction from a user based on acquisition of the unique information about the image control apparatus through the first communication IF from the image control apparatus in a state where the storing function is enabled,
wherein, in a state where the storing function is enabled and the exception conditions are set, the received print job is not executed until a print instruction for a first print job is received from a user using the storing function in a case where the first print job is received through the second communication IF from the information processing apparatus, and a second print job is executed without receiving a print instruction for the second print job from a user in a case where the second print job is received through the first communication IF from the image control apparatus.

14. The method according to claim 13,
wherein it is checked whether the image control apparatus is connected to the image forming apparatus, and
wherein, in response to checking of connection of the image control apparatus to the image forming apparatus, the unique information of the image control apparatus is acquired.

15. The method according to claim 13, wherein, when a print job that has been subjected to RIP processing in the image control apparatus is received in a state in which the function is enabled and the exception conditions are set, the print job received from the image control apparatus is executed without a print instruction from a user.

16. The method according to claim 15,
wherein the image control apparatus can communicate with the information processing apparatus via a network, and
wherein, when a print job that has been transmitted from the information processing apparatus to the image control apparatus and has not been subjected to RIP processing in the image control apparatus is received from the image control apparatus in a state in which the function is enabled, the print job that has not been subjected to RIP processing in the image control apparatus is not executed until a print instruction is received.

17. The method according to claim 13, wherein the exception conditions are an IP address of a transmission source of a print job received by the image forming apparatus.

18. The method according to claim 13, wherein the exception conditions are a type of a print job received by the image forming apparatus.

19. The method according to claim 13, wherein the exception conditions are a communication path of a print job received by the image forming apparatus.

20. The method according to claim 13, wherein the exception conditions are a communication path of print data of a print job received by the image forming apparatus.

* * * * *